(12) United States Patent
Tseng et al.

(10) Patent No.: US 11,308,016 B2
(45) Date of Patent: Apr. 19, 2022

(54) USB INTEGRATED CIRCUIT

(71) Applicant: VIA LABS, INC., New Taipei (TW)

(72) Inventors: Wen-Yu Tseng, New Taipei (TW); Wen-Hao Cheng, New Taipei (TW); Terrance Shiyang Shih, Milpitas, CA (US)

(73) Assignee: VIA LABS, INC., New Taipei (TW)

( * ) Notice: Subject to any disclaimer, the term of this patent is extended or adjusted under 35 U.S.C. 154(b) by 0 days.

(21) Appl. No.: 16/662,040

(22) Filed: Oct. 24, 2019

(65) Prior Publication Data

US 2021/0064558 A1    Mar. 4, 2021

(30) Foreign Application Priority Data

Sep. 3, 2019   (TW) .................................. 108131657

(51) Int. Cl.
*G06F 13/40*     (2006.01)
*G06F 13/42*     (2006.01)

(52) U.S. Cl.
CPC ...... *G06F 13/4022* (2013.01); *G06F 13/4068* (2013.01); *G06F 13/4282* (2013.01)

(58) Field of Classification Search
CPC ............. G06F 13/4022; G06F 13/4068; G06F 13/4282
See application file for complete search history.

(56) References Cited

U.S. PATENT DOCUMENTS

| | | | |
|---|---|---|---|
| 8,112,571 B1 * | 2/2012 | Letourneur | G06F 13/4295 710/311 |
| 9,824,057 B2 | 11/2017 | Luo | |
| 9,842,076 B2 | 12/2017 | Ghosh et al. | |
| 2015/0234764 A1 * | 8/2015 | Kline | G06F 13/126 710/5 |
| 2016/0253282 A1 * | 9/2016 | Bowers | G06F 13/102 710/316 |
| 2016/0371213 A1 * | 12/2016 | Voto | G06F 13/4045 |
| 2017/0017595 A1 * | 1/2017 | Schnell | G06F 13/4022 |

(Continued)

FOREIGN PATENT DOCUMENTS

| | | |
|---|---|---|
| CN | 208477433 | 2/2019 |
| CN | 109426638 | 3/2019 |

OTHER PUBLICATIONS

"Office Action of Taiwan Counterpart Application", dated Jun. 17, 2020, p. 1-p. 4.

*Primary Examiner* — Henry Tsai
*Assistant Examiner* — Harry Z Wang
(74) *Attorney, Agent, or Firm* — JCIPRNET (57) ABSTRACT

A USB integrated circuit includes three TX connecting component pairs and three RX connecting component pairs. The first TX connecting component pair and the first RX connecting component pair are respectively coupled to the first TX pin pair and the first RX pin pair of the first USB connector. The second TX connecting component pair and the second RX connecting component pair are respectively coupled to the first TX pin pair and the first RX pin pair of a second USB connector. The third TX connecting component pair is coupled to the second TX pin pair of the first USB connector or to the second TX pin pair of the second USB connector. The third RX connecting component pair is coupled to the second RX pin pair of the first USB connector or to the second RX pin pair of the second USB connector.

5 Claims, 3 Drawing Sheets

(56) References Cited

U.S. PATENT DOCUMENTS

| | | |
|---|---|---|
| 2017/0192924 A1 | 7/2017 | Chiba |
| 2017/0364465 A1* | 12/2017 | Tsukamoto ......... G06F 13/4022 |
| 2018/0062325 A1 | 3/2018 | Kim |

* cited by examiner

USB INTEGRATED CIRCUIT

CROSS-REFERENCE TO RELATED APPLICATION

This application claims the priority benefit of Taiwan application serial no. 108131657, filed on Sep. 3, 2019. The entirety of the above-mentioned patent application is hereby incorporated by reference herein and made a part of this specification.

BACKGROUND

Technical Field

The disclosure relates to an electronic circuit, and particularly relates to a universal serial bus (USB) integrated circuit.

Description of Related Art

USB is a standard for connecting a computer system with an external device. USB 3.1 Gen1 uses a single lane, and the transmission speed of the lane is 5 Gbps. USB 3.1 Gen2 also uses a single lane, but the transmission speed of the lane is 10 Gbps. USB 3.2 uses dual lanes, and the transmission speed of each lane is 10 Gbps. Therefore, under USB 3.2, the transmission speed is increased to 20 Gbps. USB 4.0 also uses dual lanes, and the transmission speed of each lane is 20 Gbps. Therefore, under USB 4.0, the transmission speed is increased to 40 Gbps. The reason why USB 3.2 and USB 4.0 are able to increase the transmission speed is that the usage mode of the USB Type-C connector is improved, and the transmission is accelerated.

The USB Type-C connector has two data transmission ports, so a connector can be smoothly inserted into the connection port regardless of the orientation of the connector. In USB 3.1 Gen 2, one of the data transmission ports of the USB Type-C connector is used, while the other data transmission port of the USB Type-C connector is left idling. Under USB 3.2 and USB 4.0, the two USB data transmission ports of the USB Type-C connector are used at the same time. Therefore, compared with the USB 3.1 Gen 2, USB 3.2 doubles the data transmission flow rate, and USB 4.0 quadruples the data transmission flow rate. As long as the host end and the device end are both compatible with USB 3.2 or USB 4.0, the data may be transmitted at a speed of 20 Gbps or 40 Gbps. However, if one of the ends is compatible with USB 2.0, USB 3.1 Gen1, USB 3.1 Gen2, or the Type-C terminal is converted into a Type-A terminal through an adapter, while the advantage of high speed transmission is no longer present, the device can still operate normally at a lower speed.

Figure 1:
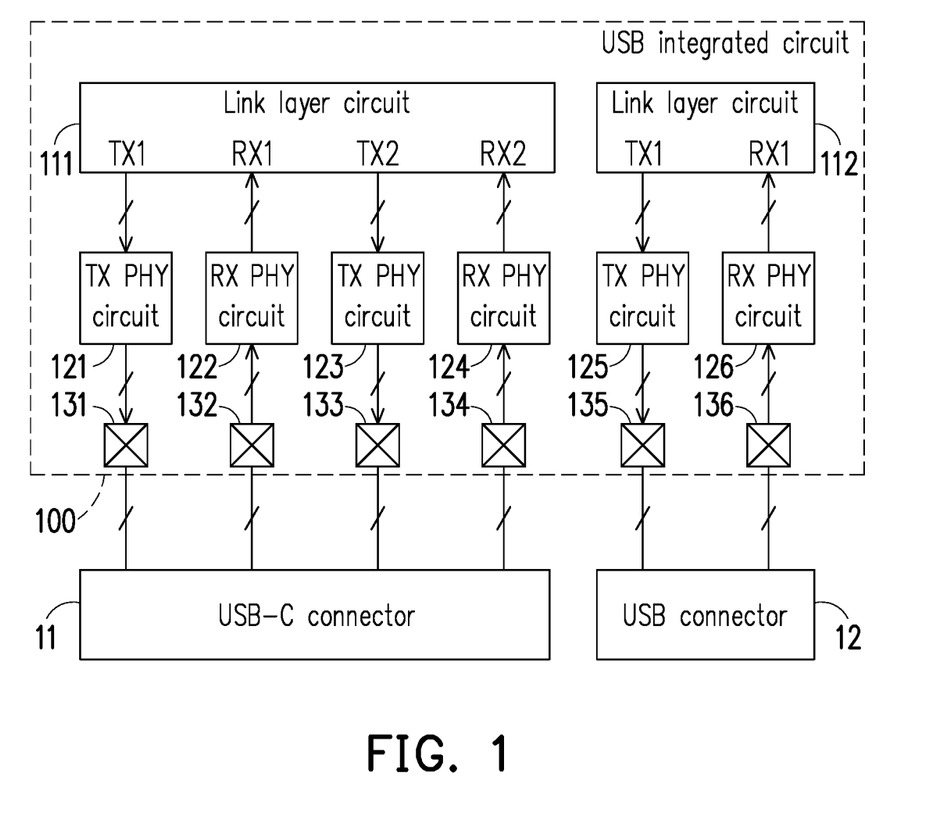
FIG. 1 is a schematic circuit block diagram illustrating a USB integrated circuit 100.

FIG. 1 is a schematic circuit block diagram illustrating a USB integrated circuit 100. The USB integrated circuit 100 shown in FIG. 1 includes a link layer circuit 111, a link layer circuit 112, a transmitting physical layer (referred to as TX PHY layer in the following) circuit 121, a receiving physical layer (referred to as RX PHY layer in the following) circuit 122, a TX PHY circuit 123, a RX PHY circuit 124, a TX PHY circuit 125, a RX PHY circuit 126, a connecting component pair 131, a connecting component pair 132, a connecting component pair 133, a connecting component pair 134, a connecting component pair 135, and a connecting component pair 136. Each of the connecting component pairs 131 to 136 may transmit a differential signal pair. The package type of the USB integrated circuit 100 may be a ball grid array (BGA) package, a quad flat non-leaded (QFN) package, or other package types. Based on the package type of the USB integrated circuit 100, each of the connecting component pairs 131 to 136 may be a solder pad, a pin, a solder ball, or other types of connecting components. For the ease of description, FIG. 1 does not illustrate a USB 2.0 circuit, a configuration channel (CC) circuit, a power circuit, and/or other circuits.

The transmitting end pair TX1 and the receiving end pair RX1 of the first lane of the link layer circuit 111 are respectively coupled to the input end of the TX PHY circuit 121 and the output end of the RX PHY circuit 122. The transmitting end pair TX2 and the receiving end pair RX2 of the second lane of the link layer circuit 111 are respectively coupled to the input end of the TX PHY circuit 123 and the output end of the RX PHY circuit 124. The transmitting end pair TX1 and the receiving end pair RX1 of the first lane of the link layer circuit 112 are respectively coupled to the input end of the TX PHY circuit 125 and the output end of the RX PHY circuit 126. The connecting component pair 131 is coupled to the output end of the TX PHY circuit 121. The connecting component pair 132 is coupled to the input end of the RX PHY circuit 122. The connecting component pair 133 is coupled to the output end of the TX PHY circuit 123. The connecting component pair 134 is coupled to the input end of the RX PHY circuit 124. The connecting component pair 135 is coupled to the output end of the TX PHY circuit 125. The connecting component pair 136 is coupled to the input end of the RX PHY circuit 126.

A USB-C connector 11 may be a USB Type-C connector or other types of USB connector compatible with the USB standard. The connecting component pair 131 is configured to be coupled to transmitting pins TX1+ and TX1− of the USB-C connector 11. The connecting component pair 132 is configured to be coupled to receiving pins RX1+ and RX1− of the USB-C connector 11. The connecting component pair 133 is configured to be coupled to transmitting pins TX2+ and TX2− of the USB-C connector 11. The connecting component pair 134 is configured to be coupled to receiving pins RX2+ and RX2− of the USB-C connector 11. A USB-C connector 12 may be a USB Type-A connector or other USB connectors compatible with the USB standard. The connecting component pair 135 is configured to be coupled to transmitting pins TX+ and TX− of the USB connector 12. The connecting component pair 136 is configured to be coupled to receiving pins RX+ and RX− of the USB-C connector 12.

It should be noted that the connecting component pairs 131 to 134 need to be coupled to the same USB connector (USB-C connector 11), while the connecting component pairs 135 to 136 need to be coupled to another USB connector (USB connector 12). The USB integrated circuit 100 is unable to offer a flexible connection configuration for the connecting component pairs 131 to 136. If the connecting component pairs 131 and 132 are coupled to the USB connector 12 and the connecting component pairs 133 to 136 are coupled to the USB-C connector 11, a USB 3.2 (USB 4.0) apparatus connected to the USB connector 11 is unable to transmit data normally.

Besides, when the apparatus compatible with USB 3.2 or USB 4.0 is connected to the USB-C connector 11, the TX PHY circuit 121, the RX PHY circuit 122, the TX PHY circuit 123, and the RX PHY circuit 124 are used at the same time, so as to provide a dual-lane transmission bandwidth to the apparatus connected to the USB-C connector 11. When the apparatus connected to the USB-C connector 11 is not compatible with USB 3.2 (USB 4.0), the TX PHY circuit 121 and the RX PHY circuit 122 are in use, but the TX PHY circuit 123 and the RX PHY circuit 124 are left idling (or the TX PHY circuit 123 and the RX PHY circuit 124 are in use, but the TX PHY circuit 121 and the RX PHY circuit 122 are left idling), so as to supply a single-lane transmission bandwidth to the apparatus connected to the USB-C connector 11. The TX PHY circuit and the RX PHY circuit that are idling not only waste chip area but also consume power.

It should be noted that, the content in the paragraph "Description of Related Art" are intended to assist understanding the disclosure. Part of the content (or all content) disclosed in the paragraph "Description of Related Art" may not be the conventional technology known by a person of ordinary skill in the art. The content disclosed in the paragraph "Description of Related Art" may not mean the content is known by a person of ordinary skill in the art before application of the disclosure.

SUMMARY

The embodiments of the disclosure provide a USB integrated circuit providing a flexible connection configuration for connecting component pairs and/or reducing the number of transmitting physical layer (referred to as TX PHY layer in the following) circuits.

An embodiment of the disclosure provides a USB integrated circuit. The USB integrated circuit includes a first transmitting connecting component pair, a first receiving connecting component pair, a second transmitting connecting component pair, a second receiving connecting component pair, a third transmitting connecting component pair, and a third receiving connecting component pair. The first transmitting connecting component pair is configured to be coupled to a first transmitting pin pair of a first USB connector. The first receiving connecting component pair is configured to be coupled to a first receiving pin pair of the first USB connector. The second transmitting connecting component pair is configured to be coupled to a first transmitting pin pair of a second USB connector. The second receiving connecting component pair is configured to be coupled to a first receiving pin pair of the second USB connector. The third transmitting connecting component pair is configured to provide a flexible connection configuration to be adaptively coupled to one of a second transmitting pin pair of the first USB connector and a second transmitting pin pair of the second USB connector. The third receiving connecting component pair is configured to provide a flexible connection configuration to be adaptively coupled to one of a second receiving pin pair of the first USB connector and a second receiving pin pair of the second USB connector.

An embodiment of the disclosure provides a USB integrated circuit. The USB integrated circuit includes a first USB port link layer circuit, a second USB port link layer circuit, a first switching circuit, a first TX PHY circuit, a second switching circuit, a first transmitting connecting component pair, and a second transmitting connecting component pair. A first selecting end pair of the first switching circuit is coupled to a first transmitting end pair of the first USB port link layer circuit. A second selecting end pair of the first switching circuit is coupled to a transmitting end pair of the second USB port link layer circuit. An input end pair of the first TX PHY circuit is coupled to a common end pair of the first switching circuit. A common end pair of the second switching circuit is coupled to an output end of the first TX PHY circuit. A first transmitting connecting component pair is coupled to a first selecting end pair of the second switching circuit. A second transmitting connecting component pair is coupled to a second selecting end pair of the second switching circuit.

Based on the above, in some embodiments of the disclosure, the USB integrated circuit may provide a flexible connection configuration for the connecting component pairs. In some embodiments of the disclosure, the TX PHY circuit and the RX PHY circuit may be dynamically switched to different USB connectors according to the connection configurations and the usage scenarios. Therefore, the number of TX PHY circuits and the number of RX PHY circuits in the USB integrated circuit can be reduced.

To make the aforementioned and other features of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts.

Throughout the whole specification (including claims), the term "couple" or "connect" may refer to any direct or indirect means of connection. For example, if a first device is described to be coupled to a second device, it is interpreted as that the first device is directly coupled to the second device, or the first device is indirectly coupled to the second device through other devices or connection means. The terms "first" and "second" mentioned throughout the specification (including claims) are used to name the elements or distinguish different embodiments or scopes, instead of restricting the upper limit or the lower limit of the numbers of the elements, nor limiting the order of the elements. Moreover, wherever possible, components/members/steps using the same referential numbers in the drawings and description refer to the same or like parts. Components/members/steps using the same referential numbers or using the same terms in different embodiments may cross-refer related descriptions.

Figure 2:
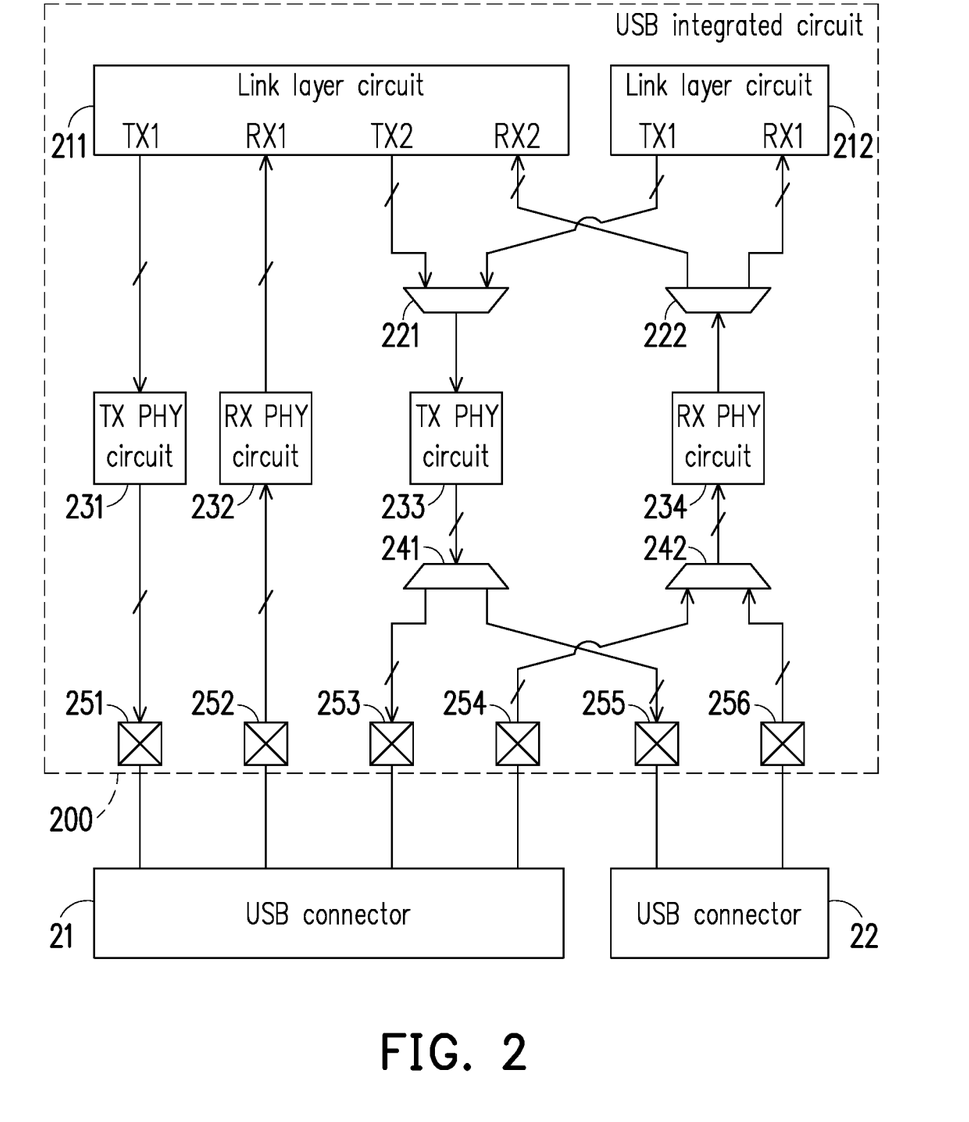
FIGS. 2 and 3 are schematic circuit block diagrams illustrating a USB integrated circuit according to an embodiment of the disclosure.
Figure 3:
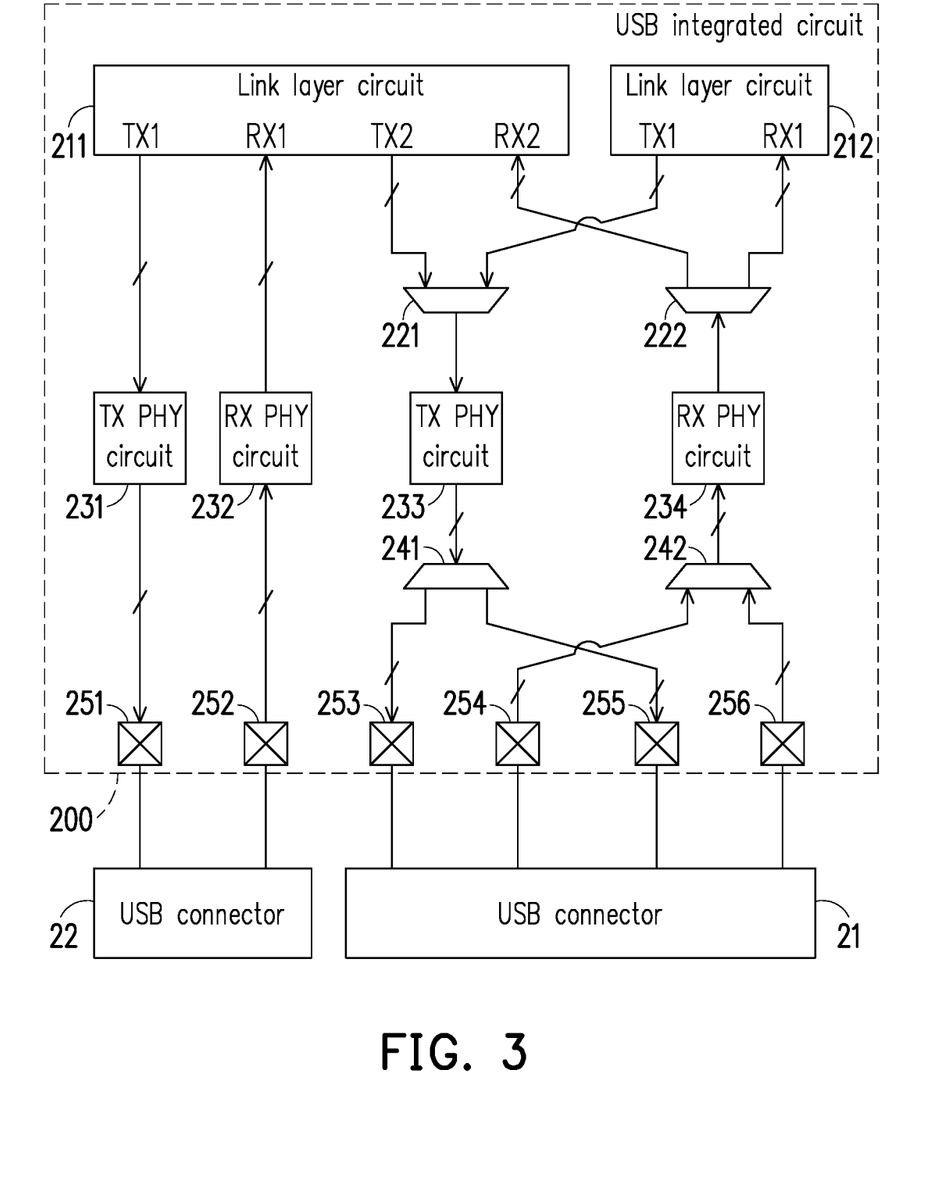

FIGS. 2 and 3 are schematic circuit block diagrams illustrating a USB integrated circuit 200 according to an embodiment of the disclosure. The USB integrated circuit 200 shown in FIGS. 2 and 3 has a plurality of connecting component pairs, such as a transmitting connecting component pair 251, a receiving connecting component pair 252, a transmitting connecting component pair 253, a receiving connecting component pair 254, a transmitting connecting component pair 255, and a receiving connecting component pair 256. Each of the connecting component pairs 251 to 256 may transmit a differential signal pair. Based on the design requirements, the package type of the USB integrated circuit 200 may be a ball grid array (BGA) package, a quad flat no-leaded (QFN) package, or other package types. Based on the package type of the USB integrated circuit 200, each of the connecting component pairs 251 to 256 may be a solder pad, a pin, a solder ball, or other types of connecting components.

Based on the requirements of application scenarios, the USB integrated circuit 200 may provide a flexible connection configuration for the connecting component pairs 251 to 256. The transmitting connecting component pair 251 may be coupled to the first transmitting pin pair of the first USB connector, the receiving connecting component pair 252 may be coupled to the first receiving pin pair of the first USB connector, the transmitting connecting component pair 255 may be coupled to the first transmitting pin pair of the second USB connector, and the receiving connecting component pair 256 may be coupled to the first receiving pin pair of the second USB connector. In different application scenarios, the transmitting connecting component pair 253 may provide a flexible connection configuration, so as to be adaptively coupled to one of the second transmitting pin pair of the first USB connector and the second transmitting pin pair of the second USB connector. In different application scenarios, the receiving connecting component pair 254 may provide a flexible connection configuration, so as to be adaptively coupled to one of the second receiving pin pair of the first USB connector and the second receiving pin pair of the second USB connector.

For example, in the embodiment shown in FIG. 2, the connecting component pairs 251 to 254 of the USB integrated circuit 200 may be respectively coupled to the first transmitting pin pair, the first receiving pin pair, the second transmitting pin pair, and the second receiving pin pair of a USB connector 21 (the first USB connector) according to the design requirement, and the connecting component pairs 255 to 256 may be respectively coupled to the first transmitting pin pair and the first receiving pin pair of a USB connector 22 (the second USB connector) according to the design requirement. In the embodiment shown in FIG. 3, the connecting component pairs 251 to 252 of the USB integrated circuit 200 may be respectively coupled to the first transmitting pin pair and the first receiving pin pair of the USB connector 22 (the first USB connector) according to the design requirement, and the connecting component pairs 253 to 256 may be respectively coupled to the first transmitting pin pair the first receiving pin pair, the second transmitting pin pair, and the second receiving pin pair of the USB connector 21 (the second USB connector) according to the design requirement.

According to the design requirement, the USB connector 21 may be a USB Type-C connector or other types of USB connectors, and the USB connector 22 may be a USB Type-A connector, a USB Type-B connector, a USB Type-C connector, or other types of USB connectors. The USB connector 21 and the USB connector 22 may be connectors compatible with the USB standard. Therefore, the implementation details thereof will not be further described in the following. For example, in the embodiment shown in FIG. 2, the transmitting connecting component pair 251 may be connected to transmitting pins TX1+ and TX1− of the USB connector 21, the receiving connecting component pair 252 may be connected to receiving pins RX1+ and RX1− of the USB connector 21, the transmitting connecting component pair 253 may be connected to transmitting pins TX2+ and TX2− of the USB connector 21, the receiving connecting component pair 254 may be connected to receiving pins RX2+ and RX2− of the USB connector 21, the transmitting connecting component pair 255 may be connected to transmitting pins TX+ and TX− of the USB connector 22, and the receiving connecting component pair 256 may be connected to receiving pins RX+ and RX− of the USB connector 22. The USB connector 21 and the USB connector 22 shown in FIG. 3 may be inferred based on relevant descriptions about the USB connector 21 and the USB connector 22 shown in FIG. 2, so details in this regard will not be repeated in the following.

The USB integrated circuit 200 shown in FIGS. 2 and 3 further includes a USB port link layer circuit 211, a USB port link layer circuit 212, a switching circuit 221, a switching circuit 222, a transmitting physical layer (referred to as TX PHY in the following) circuit 231, a receiving physical layer (referred to as RX PHY in the following) circuit 232, a TX PHY circuit 233, a RX PHY circuit 234, a switching circuit 241, and a switching circuit 242. The input end pair of the TX PHY circuit 231 is coupled to the transmitting end pair TX1 of the USB port link layer circuit 211. The transmitting connecting component pair 251 is coupled to the output end pair of the TX PHY circuit 231. The output end of the RX PHY circuit 232 is coupled to the transmitting end pair RX1 of the USB port link layer circuit 211. The receiving connecting component pair 252 is coupled to the input end pair of the RX PHY circuit 232.

The USB port link layer circuit 211 and the USB port link layer circuit 212 shown in FIGS. 2 and 3 may be inferred based on relevant descriptions about the link layer circuit 111 and the link layer circuit 112 shown in FIG. 1. The TX PHY circuit 231 and the TX PHY circuit 233 shown in FIGS. 2 and 3 may be inferred based on relevant descriptions about the TX PHY circuit 121, the TX PHY circuit 123, and the TX PHY circuit 125 shown in FIG. 1. The RX PHY circuit 232 and the RX PHY circuit 234 shown in FIGS. 2 and 3 may be inferred based on relevant descriptions about the RX PHY circuit 122, the RX PHY circuit 124, and the RX PHY circuit 126 shown in FIG. 1. Therefore, details in the above regards will not be repeated in the following. For the ease of description, a USB 2.0 circuit, a configuration channel (CC) circuit, a power circuit, and/or other circuits are not shown in the USB integrated circuit 200 shown in FIGS. 2 and 3.

Referring to FIGS. 2 and 3, the first selecting end pair of the switching circuit 221 is coupled to the transmitting end pair TX2 of the USB port link layer circuit 211, the second selecting end pair of the switching circuit 221 is coupled to the transmitting end pair TX1 of the USB port link layer circuit 212, the first selecting end pair of the switching circuit 222 is coupled to the receiving end pair RX2 of the USB port link layer circuit 211, and the second selecting end pair of the switching circuit 222 is coupled to the receiving end pair RX1 of the USB port link layer circuit 212. The input end pair of the TX PHY circuit 233 is coupled to the common end pair of the switching circuit 221. The output end pair of the TX PHY circuit 233 is coupled to the common end pair of the switching circuit 241. The first selecting end pair of the switching circuit 241 is coupled to the transmitting connecting component pair 253. The second selecting end pair of the switching circuit 241 is coupled to the transmitting connecting component pair 255. The output end pair of the RX PHY circuit 234 is coupled to the common end pair of the switching circuit 222. The input end pair of the RX PHY circuit 234 is coupled to the common end pair of the switching circuit 242. The first selecting end pair of the switching circuit 242 is coupled to the receiving connecting component pair 254. The second selecting end pair of the switching circuit 242 is coupled to the receiving connecting component pair 256.

In the connection configuration shown in FIG. 2, the transmitting connecting component pair 251, the receiving connecting component pair 252, the transmitting connecting component pair 253, and the receiving connecting component pair 254 are coupled to the USB connector 21. The USB connector 21 shown in FIG. 2 may be a USB Type-C connector, so as to be compatible with the dual-lane transmission under USB 3.2 (4.0), the single-lane transmission under USB 3.1 Gen2, the signal-lane transmission under USB 3.1 Gen1, and/or the transmission under USB 2.0. In the connection configuration shown in FIG. 2, the USB connector 22 may be a USB Type-A connector, so as to be compatible with the single-lane transmission under USB 3.1 Gen2, the single-lane transmission under USB 3.1 Gen1, and/or the transmission under USB 2.0. In the following, the operations of the connection configuration shown in FIG. 2 in five usage scenarios will be described in detail.

Referring to FIG. 2, in the first usage scenario, it is assumed that an apparatus compatible with USB 3.2 (USB 4.0) is firstly connected to the USB connector 21, and an apparatus compatible with USB 3.1 Gen2 (USB 3.1 Gen1) is later connected to the USB connector 22. After the apparatus is connected to the USB connector 21, the USB integrated circuit 200 may control the switching circuit 221 and the switching circuit 241, so that the TX PHY circuit 233 is coupled between the transmitting end pair TX2 of the USB port link layer circuit 211 and the transmitting connecting component pair 253. Similarly, the USB integrated circuit 200 may control the switching circuit 222 and the switching circuit 242, so that the RX PHY circuit 234 is coupled between the receiving end pair RX2 of the USB port link layer circuit 211 and the receiving connecting component pair 254. In other words, the TX PHY circuit 233 and the RX PHY circuit 234 are dynamically configured to be used by the USB connector 21. Therefore, the apparatus connected to the USB connector 21 may use the dual-lane transmission bandwidth under USB 3.2 (USB 4.0). In the first usage scenario, even though the apparatus connected to the USB connector 22 is unable to use the TX PHY circuit 233 and the RX PHY circuit 234, the apparatus connected to the USB connector 22 may still transmit data through a USB 2.0 circuit (not shown) of the USB integrated circuit 200.

Referring to FIG. 2, in the second usage scenario, it is assumed that an apparatus compatible with USB 3.1 Gen2 (USB 3.1 Gen1) is firstly connected to the USB connector 21, and an apparatus compatible with USB 3.1 Gen2 (USB 3.1 Gen1) is later connected to the USB connector 22. Here, it is assumed that the apparatus connected to the USB connector 21 uses the lane of the transmitting connecting component pair 251 and the receiving connecting component pair 252, but does not use the lane of the transmitting connecting component pair 253 and the receiving connecting component pair 254. After the apparatus is connected to the USB connector 21, the USB integrated circuit 200 may control the switching circuit 221 and the switching circuit 241, so that the TX PHY circuit 233 is coupled between the transmitting end pair TX1 of the USB port link layer circuit 212 and the transmitting connecting component pair 255. Similarly, the USB integrated circuit 200 may control the switching circuit 222 and the switching circuit 242, so that the RX PHY circuit 234 is coupled between the receiving end pair RX1 of the USB port link layer circuit 212 and the receiving connecting component pair 256. In other words, the TX PHY circuit 233 and the RX PHY circuit 234 are dynamically configured to be used by the USB connector 22.

Therefore, the apparatus connected to the USB connector 21 may use the transmission bandwidth of the lane of the TX PHY circuit 231 and the RX PHY circuit 232, and the apparatus connected to the USB connector 22 may use the transmission bandwidth of the lane of the TX PHY circuit 233 and the RX PHY circuit 234.

Referring to FIG. 2, in the third usage scenario, it is assumed that an apparatus compatible with USB 3.1 Gen2 (USB 3.1 Gen1) is firstly connected to the USB connector 21, and an apparatus compatible with USB 3.1 Gen2 (USB 3.1 Gen1) is later connected to the USB connector 22. Here, it is assumed that the apparatus connected to the USB connector 21 uses the lane of the transmitting connecting component pair 253 and the receiving connecting component pair 254, but does not use the lane of the transmitting connecting component pair 251 and the receiving connecting component pair 252. After the apparatus is connected to the USB connector 21, the USB integrated circuit 200 may control the switching circuit 221 and the switching circuit 241, so that the TX PHY circuit 233 is coupled between the transmitting end pair TX2 of the USB port link layer circuit 211 and the transmitting connecting component pair 253. Similarly, the USB integrated circuit 200 may control the switching circuit 222 and the switching circuit 242, so that the RX PHY circuit 234 is coupled between the receiving end pair RX2 of the USB port link layer circuit 211 and the receiving connecting component pair 254. In other words, the TX PHY circuit 233 and the RX PHY circuit 234 are dynamically configured to be used by the USB connector 21. Therefore, the apparatus connected to the USB connector 21 may use the transmission bandwidth of the lane of the TX PHY circuit 233 and the RX PHY circuit 234. In the third usage scenario, even though the apparatus connected to the USB connector 22 is unable to use the TX PHY circuit 233 and the RX PHY circuit 234, the apparatus connected to the USB connector 22 may still transmit data through a USB 2.0 circuit (not shown) of the USB integrated circuit 200.

Referring to FIG. 2, in the fourth usage scenario, it is assumed that an apparatus compatible with USB 3.1 Gen2 (USB 3.1 Gen1) is firstly connected to the USB connector 22, and an apparatus compatible with USB 3.2 (USB 4.0) is later connected to the USB connector 21. After the apparatus is connected to the USB connector 22, the USB integrated circuit 200 may control the switching circuit 221 and the switching circuit 241, so that the TX PHY circuit 233 is coupled between the transmitting end pair TX1 of the USB port link layer circuit 212 and the transmitting connecting component pair 255. Similarly, the USB integrated circuit 200 may control the switching circuit 222 and the switching circuit 242, so that the RX PHY circuit 234 is coupled between the receiving end pair RX1 of the USB port link layer circuit 212 and the receiving connecting component pair 256. In other words, the TX PHY circuit 233 and the RX PHY circuit 234 are dynamically configured to be used by the USB connector 22. Here, it is assumed that the apparatus connected to the USB connector 21 uses the lane of the transmitting connecting component pair 251 and the receiving connecting component pair 252, but does not use the lane of the transmitting connecting component pair 253 and the receiving connecting component pair 254. After the apparatus is connected to the USB connector 21, the apparatus connected to the USB connector 21 may use the transmission bandwidth of the lane of the TX PHY circuit 231 and the RX PHY circuit 232, and the apparatus connected to the USB connector 22 may use the transmission bandwidth of the lane of the TX PHY circuit 233 and the RX PHY circuit 234.

Referring to FIG. 2, in the fifth usage scenario, it is assumed that an apparatus compatible with USB 3.1 Gen2 (USB 3.1 Gen1) is firstly connected to the USB connector 22, and an apparatus compatible with USB 3.2 (USB 4.0) is later connected to the USB connector 21. After the apparatus is connected to the USB connector 22, the USB integrated circuit 200 may control the switching circuit 221 and the switching circuit 241, so that the TX PHY circuit 233 is coupled between the transmitting end pair TX1 of the USB port link layer circuit 212 and the transmitting connecting component pair 255. Similarly, the USB integrated circuit 200 may control the switching circuit 222 and the switching circuit 242, so that the RX PHY circuit 234 is coupled between the receiving end pair RX1 of the USB port link layer circuit 212 and the receiving connecting component pair 256. In other words, the TX PHY circuit 233 and the RX PHY circuit 234 are dynamically configured to be used by the USB connector 22. Here, it is assumed that the apparatus connected to the USB connector 21 uses the lane of the transmitting connecting component pair 253 and the receiving connecting component pair 254, but does not use the lane of the transmitting connecting component pair 251 and the receiving connecting component pair 252. After the apparatus is connected to the USB connector 21, even though the apparatus connected to the USB connector 21 is unable to use the TX PHY circuit 233 and the RX PHY circuit 234, the apparatus connected to the USB connector 21 may still transmit data through a USB 2.0 circuit (not shown) of the USB integrated circuit 200.

In the connection configuration shown in FIG. 3, the transmitting connecting component pair 253, the receiving connecting component pair 254, the transmitting connecting component pair 255, and the receiving connecting component pair 256 are coupled to the USB connector 21, and the USB connector 22 is connected to the connecting component pairs 251 to 252. The USB connector 21 shown in FIG. 3 may be a USB Type-C connector. The USB connector 22 shown in FIG. 3 may be a USB Type-A connector. In the connection configuration shown in FIG. 3, the USB integrated circuit 200 may control the switching circuit 221 and the switching circuit 222, so that the input end of the TX PHY circuit 233 is coupled to the transmitting end pair TX1 of the USB port link layer circuit 212, and the output end of the RX PHY circuit 234 is coupled to the receiving end pair RX1 of the USB port link layer circuit 212. In the following, the operations of the connection configuration shown in FIG. 3 in two usage scenarios will be described in detail.

Referring to FIG. 3, in the first usage scenario, it is assumed that the apparatus connected to the USB connector 21 uses the lane of the transmitting connecting component pair 253 and the receiving connecting component pair 254, but does not use the lane of the transmitting connecting component pair 255 and the receiving connecting component pair 256. After the apparatus is connected to the USB connector 21, the USB integrated circuit 200 may control the switching circuit 241 and the switching circuit 242, so that the output end of the TX PHY circuit 233 is coupled to the transmitting connecting component pair 253, and the input end of the RX PHY circuit 234 is coupled to the receiving connecting component pair 254.

Referring to FIG. 3, in the second usage scenario, it is assumed that the apparatus connected to the USB connector 21 uses the lane of the transmitting connecting component pair 255 and the receiving connecting component pair 256, but does not use the lane of the transmitting connecting component pair 253 and the receiving connecting component pair 254. After the apparatus is connected to the USB connector 21, the USB integrated circuit 200 may control the switching circuit 241 and the switching circuit 242, so that the output end of the TX PHY circuit 233 is coupled to the transmitting connecting component pair 255, and the input end of the RX PHY circuit 234 is coupled to the receiving connecting component pair 256.

In view of the foregoing, in some embodiments of the disclosure, the USB integrated circuit 200 may provide a flexible connection configuration for the connecting component pairs 251 to 256. In some embodiments of the disclosure, the TX PHY circuit 233 and the RX PHY circuit 234 may be dynamically switched to different USB connectors according to the connection configurations and the usage scenarios. Therefore, the number of TX PHY circuits and the number of RX PHY circuits in the USB integrated circuit 200 can be reduced.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A Universal Serial Bus (USB) integrated circuit, comprising:
    a first transmitting connecting component pair, a second transmitting connecting component pair, and a third transmitting connecting component pair; and
    a first receiving connecting component pair, a second receiving connecting component pair, and a third receiving connecting component pair,
    wherein in a first connecting configuration, the first transmitting component pair, the third transmitting connecting component pair, the first receiving component pair and the third receiving component pair are configured to be respectively coupled to first transmitting pin pair, a second transmitting pin pair, a first receiving pin pair, a second receiving pin pair of a first USB connector, the second transmitting component pair and the second receiving component pair are configured to be respectively coupled to a first transmitting pin pair and a first receiving pin pair of a second USB connector,
    wherein in a second connecting configuration, the first transmitting component pair and the first receiving component pair are configured to be respectively coupled to first transmitting pin pair and a first receiving pin pair of the first USB connector, the second transmitting component pair, the third transmitting component pair, the second receiving component pair, and the third receiving component pair are configured to be respectively coupled to the first transmitting pin pair, the second transmitting pin pair, the first receiving pin pair, and the second receiving pin pair of the second USB connector,
    wherein the first transmitting connecting component pair, the second transmitting connecting component pair and the third transmitting connecting component pair are Superspeed transmit differential pairs,
    wherein the first receiving connecting component pair, the second receiving connecting component pair and the third receiving connecting component pair are Superspeed receive differential pairs.

2. The USB integrated circuit as claimed in claim 1, wherein:
    in a case where the first transmitting connecting component pair, the first receiving connecting component pair, the third transmitting connecting component pair, and the third receiving connecting component pair are coupled to the first USB connector, the first USB connector is a USB Type-C connector, and in a case where the second transmitting connecting component pair, the second receiving connecting component pair, the third transmitting connecting component pair, and the third receiving connecting component pair are coupled to the second USB connector, the second USB connector is a USB T e-C connector.

3. A Universal Serial Bus (USB) integrated circuit, comprising:

a first USB port link layer circuit;

a second USB port link layer circuit;

a first switching circuit, wherein a first selecting end pair of the first switching circuit is coupled to a first transmitting end pair of the first USB port link layer circuit, and a second selecting end pair of the first switching circuit is coupled to a transmitting end pair of the second USB port link layer circuit;

a first transmitting physical layer circuit, having an input end pair coupled to a common end pair of the first switching circuit;

a second switching circuit, wherein a common end pair of the second switching circuit is coupled to an output end of the first transmitting physical layer circuit;

a first transmitting connecting component pair, coupled to a first selecting end pair of the second switching circuit;

a second transmitting connecting component pair, coupled to a second selecting end pair of the second switching circuit;

a second transmitting physical layer circuit, wherein an input end pair of the second transmitting physical layer circuit is directly coupled to a second transmitting end pair of the first USB port link layer circuit;

a third transmitting connecting component pair, directly coupled to an output end pair of the second transmitting physical layer circuit;

a third switching circuit, wherein a first selecting end pair of the third switching circuit is coupled to a first receiving end pair of the first USB port link layer circuit, and a second selecting end pair of the third switching circuit is coupled to a receiving end pair of the second USB port link layer circuit;

a first receiving physical layer circuit, having an output end pair coupled to a common end pair of the third switching circuit;

a fourth switching circuit, wherein a common end pair of the fourth switching circuit is coupled to an input end of the first receiving physical layer circuit;

a first receiving connecting component pair, coupled to a first selecting end pair of the fourth switching circuit; and a second receiving connecting component pair, coupled to a second selecting end pair of the fourth switching circuit.

4. The USB integrated circuit as claimed in claim 3, wherein:

the first transmitting connecting component pair is configured to be coupled to a first transmitting pin pair of a first USB connector, the first receiving connecting component pair is configured to be coupled to a first receiving pin pair of the first USB connector, the second transmitting connecting component pair is configured to provide a flexible connection configuration to be adaptively coupled to one of a second transmitting pin pair of the first USB connector and a first transmitting pin pair of a second USB connector, and the second receiving connecting component pair is configured to provide a flexible connection configuration to be adaptively coupled to one of a second receiving pin pair of the first USB connector and a first receiving pin pair of the second USB connector.

5. The USB integrated circuit as claimed in claim 3, further comprising:

a second receiving physical layer circuit, wherein an output end pair of the second receiving physical layer circuit is coupled to a second receiving end pair of the first USB port link layer circuit; and a third receiving connecting component pair, coupled to an input end pair of the second receiving physical layer circuit.

* * * * *